United States Patent
Epitaux et al.

(10) Patent No.: US 7,941,052 B2
(45) Date of Patent: *May 10, 2011

(54) BI-DIRECTIONAL PARALLEL OPTICAL LINK

(75) Inventors: Marc Epitaux, Sunnyvale, CA (US); Jean-Marc Verdiell, Palo Alto, CA (US); Peter Kirkpatrick, San Francisco, CA (US); Jan P. Peeters Weem, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 626 days.

This patent is subject to a terminal disclaimer.

(21) Appl. No.: 11/634,743

(22) Filed: Dec. 5, 2006

(65) Prior Publication Data

US 2007/0147846 A1    Jun. 28, 2007

Related U.S. Application Data

(63) Continuation-in-part of application No. 11/321,364, filed on Dec. 28, 2005, now Pat. No. 7,680,417.

(51) Int. Cl.
*H04B 10/00* (2006.01)
(52) U.S. Cl. ......... 398/138; 398/128; 398/130; 398/135
(58) Field of Classification Search .................. 398/128, 398/135, 138, 139, 164, 175, 176
See application file for complete search history.

(56) References Cited

U.S. PATENT DOCUMENTS

| | | | |
|---|---|---|---|
| 5,487,120 A * | 1/1996 | Choy et al. .................. 385/24 |
| 6,398,425 B2 | 6/2002 | Williams et al. | |
| 7,295,783 B2 * | 11/2007 | Singh et al. .................. 398/175 |
| 2002/0003640 A1 | 1/2002 | Trezza | |
| 2004/0175077 A1 | 9/2004 | Weber | |
| 2004/0207926 A1 | 10/2004 | Buckman et al. | |
| 2005/0036785 A1 * | 2/2005 | Tervonen et al. .................. 398/49 |
| 2005/0058389 A1 | 3/2005 | Ouchi | |
| 2007/0147846 A1 | 6/2007 | Epitaux et al. | |

OTHER PUBLICATIONS

Non-Final Office Action (dated Jan. 29, 2009), U.S. Appl. No. 11/321,364, filed Dec. 28, 2005, First Named Inventor: Marc Epitaux, (21 pages).
PCT International Search Report (dated May 7, 2007), International Application No. PCT/US2006/047651—International Filing Date Dec. 12, 2006 [11 pages].

(Continued)

*Primary Examiner* — Dalzid Singh
(74) *Attorney, Agent, or Firm* — Blakely, Sokoloff, Taylor & Zafman LLP (57) ABSTRACT

An optical communications device has light transmitters of a first wavelength that are coupled to a number of first waveguides of an optical data link, respectively. A second set of light transmitters of a second, different wavelength are coupled to another set of waveguides of the link, respectively. The light transmitters are to transmit data from the same data processing element that is to use the link to communicate with another data processing element. The device also has a set of light detectors of the first wavelength that are coupled to the second set of waveguides, respectively. Another set of light detectors of the second wavelength are coupled to the set of first waveguides, respectively. Other embodiments are also described and claimed.

19 Claims, 5 Drawing Sheets

OTHER PUBLICATIONS

PCT International Preliminary Report on Patentability (dated Jul. 10, 2008), International Application No. PCT/US2006/047651—International Filing Date Dec. 12, 2006, (8 pages).

Final Office Action (dated Jul. 16, 2009), U.S. Appl. No. 11/321,364, filed Dec. 28, 2005, First Named Inventor: Marc Epitaux, (5 pages).

* cited by examiner

BI-DIRECTIONAL PARALLEL OPTICAL LINK

This application is a continuation-in-part of U.S. application Ser. No. 11/321,364 filed Dec. 28, 2005 now U.S. Pat. No. 7,680,417 entitled "Bi-Directional Parallel Optical Link".

FIELD OF THE INVENTION

An embodiment of the invention relates generally to optical waveguide communications and, more particularly, to spectrally combining and dividing fiber optic signals and arranging optical transmitters and receivers for bi-directional communication.

BACKGROUND

In the future, optical input/output (I/O) will be used in computer systems to transmit data between system components. Optical I/O is able to attain higher system bandwidth with lower electromagnetic interference than conventional copper I/O methods. Optical I/O can achieve a higher bandwidth-distance product than electrical I/O, allowing systems to operate at high bandwidth across physically longer links, such as a back plane interconnect. In order to implement optical I/O, radiant light energy is coupled to a waveguide such as an optical fiber from an optoelectronic device such as a laser at a transmitting position in the link. At a receiving position of the link, a photo detector is coupled to the waveguide, to receive the propagating optical communications signal. Additional circuitry, typically electronic circuitry, is provided at the transmitting as well as the receiving positions, to modulate and demodulate the optical signal with the information or payload data that is being transferred by the link. Currently, communication systems such as switches, routers, and other packet and time division multiplexed (TDM) processing devices use optical communication links to great advantage.

In the quest to increase the bandwidth of an optical link, several topologies have been proposed and implemented. These topologies increase the number of waveguides operating in parallel, launch a multitude of different wavelengths simultaneously in the same waveguide, and/or operate a waveguide in full duplex. For example, there is the basic, multi-wavelength optical link in which a single waveguide is driven in just one direction by an optical signal that has the payload carried by multiple (different) wavelengths. At an upstream unit, several transmitters transform the electrical data into different wavelength optical signals, multiplex or combine them into a single waveguide and then transmit through this single waveguide in a downstream direction. At a downstream unit, a demultiplexer does the reverse-it separates the wavelengths and converts the different wavelength signals into several electrical signals. In that case, data is transferred over the single waveguide in just one direction. To transfer data in the opposite direction, a second, identical link may be provided (with a separate waveguide).

In another type of optical link, a single waveguide is used bi-directionally, to transfer data in both directions. At a first end of the waveguide, an optical transmitter launches a signal (containing data to be transferred), at a single wavelength $\lambda_1$. At a second end of the waveguide, an optical receiver tuned to $\lambda_1$ will detect that data. Also, at the second end, there is an optical transmitter that is transmitting data in the direction of the first end, using $\lambda_2$. This in turn is detected at the first end by an optical receiver tuned to $\lambda_2$. Chromatic filters are used to spectrally separate the counter-propagating signals that have different wavelengths, at each end of the waveguide. Such a link can transfer data simultaneously in both directions, over the single waveguide.

In a further attempt to increase bandwidth, parallel optical links have been proposed that have multiple waveguides in each direction of propagation. In other words, instead of having a single waveguide to transfer data in each direction, there are multiple waveguides where each can transfer data simultaneously in parallel, in the same direction. For two way communications, each end point has a parallel optical transmitter and a parallel optical receiver. In this case, each waveguide is operated unidirectionally.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Figure 1:
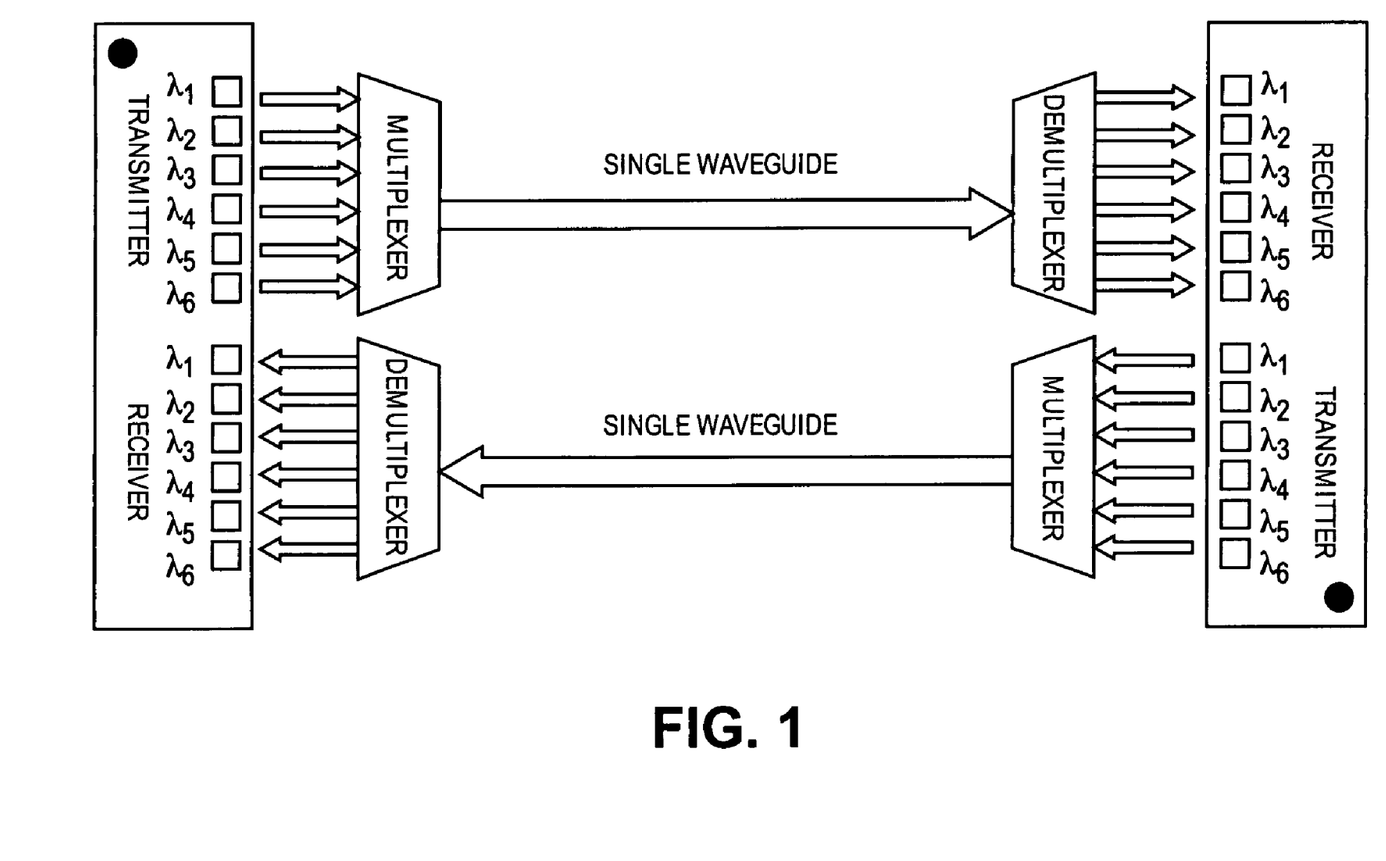
FIG. 1 shows a proposed WDM optical link.

An embodiment of the invention is a bi-directional, parallel optical link that uses multiple wavelengths. An advantageous arrangement of the transmitters and receivers within an optical transceiver is also disclosed. Before describing the various embodiments of the invention, two other multi-wavelength links are illustrated in FIG. 1 and in FIG. 2, and some of their limitations are discussed.

A wavelength division multiplexed (WDM) optical link has been proposed that uses optical transceivers that have a certain arrangement of transmitters and receivers. This link is illustrated in FIG. 1. In one such system, which is not considered "parallel" as there is only a single optical fiber used to transfer data in each direction, a multi wavelength signal is used for each direction. Each end has a transceiver that has a number of transmitters (equal to the number of wavelengths) and a corresponding number of receivers. The transmitters are coupled to their associated, single waveguide through the use of an optical multiplexer. Similarly, a number of optical receivers in each transceiver are coupled to that waveguide through an optical demultiplexer. With such a configuration, the optical path length between each transmitter-receiver pair (transmitter at one end of the waveguide and the associated receiver at the other end) is advantageously the same. However, the physical arrangement of each transceiver is not the same, meaning that a system needs two different transceivers to operate such a link. This can be seen in FIG. 1, by rotating the device on the right 180 degrees in the plane, so that the dot in the lower right hand corner of the device aligns with the corresponding dot of the device on the left.

Figure 2:
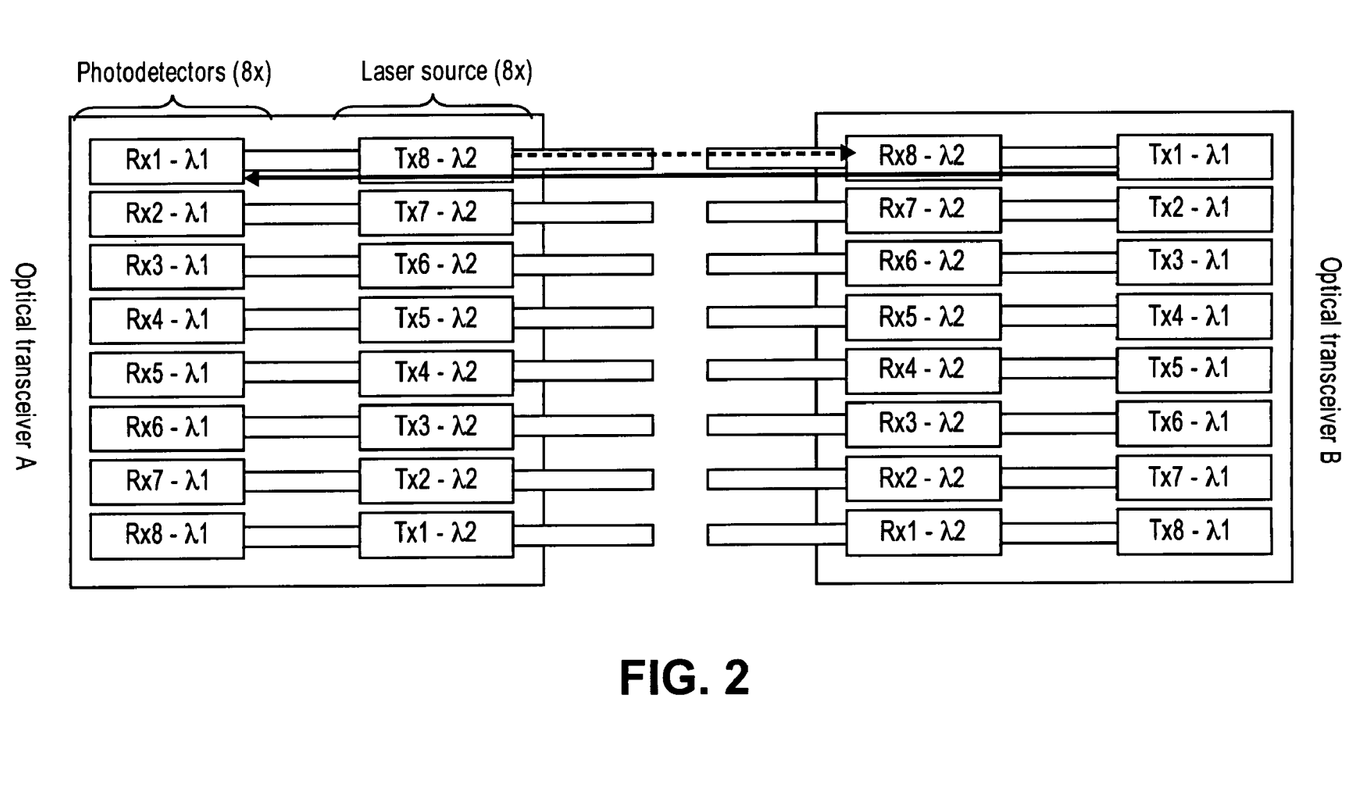
FIG. 2 shows a proposed parallel, bi-directional optical link.

A proposed, bi-directional, parallel optical link is shown in FIG. 2. In this case, there are eight optical waveguides, each of which is operated bi-directionally with 2 in one direction (left to right) and $\lambda_1$ in the opposite direction. The two wavelengths here support eight different channels, over the eight waveguides, respectively. Chromatic filters may be used to couple the transmitter light signal into the waveguides, and couple the receiver light signal from the waveguides, at each end of the link. Although this topology provides increased bandwidth, the path length of the transmitter-receiver pair in one direction is not the same as the path length of the transmitter-receiver pair for the other direction, of a given channel. In addition, the arrangement of transmitters and receivers in each transceiver is different, and requires two unique transceivers to operate such a system.

Figure 3:
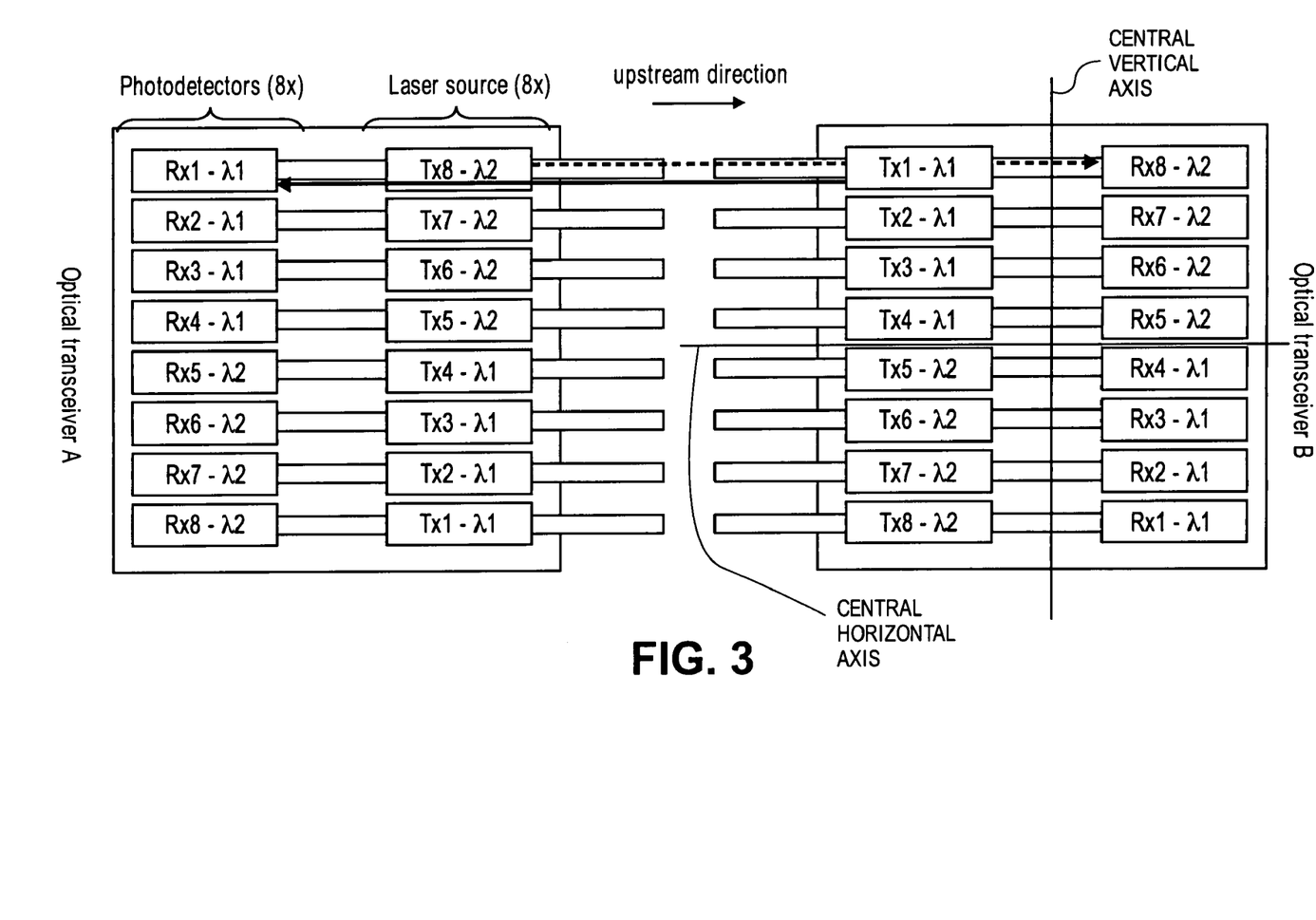
FIG. 3 shows a parallel, bi-directional optical link arranged in accordance with an embodiment of the invention.

Turning now to FIG. 3, a bi-directional, parallel link according to an embodiment of the invention is shown. In this example, the link uses eight optical fibers that are operated with two wavelengths. The concept is, however, more generally applicable to two or more fibers that are operating in parallel, with two or more wavelengths. The transceivers may be part of a data processing system, and in particular one having two data processing elements that are communicatively coupled to each other via the optical link as shown in FIG. 3. A data processing system in accordance with an embodiment of the invention is described below in connection with FIG. 5.

The transceivers in FIG. 3 are designed to transfer data between each other over a number of "channels". Each channel may be defined by an upstream component of the link and a downstream component of the link (to support two-way communication). Each of the waveguides in FIG. 3 is operated bi-directionally to transfer the data. The channels are "spread" across at least an even number of waveguides that are available in the link. Consider for example the waveguides of channel 1. This channel has, or can be said to be associated with, a first transmitter-receiver pair indicated as Tx1-$\lambda_1$ in transceiver A, and Rx1-$\lambda_1$ in transceiver B. As a channel itself supports two way communication, there is another transmitter-receiver pair, namely Tx1-$\lambda_1$ in transceiver B and Rx1-$\lambda_1$ in transceiver A. These transmitter-receiver pairs operate on the same wavelength ($\lambda_1$ in this case), but in different waveguides. Note how the arrangement is such that optical path length of the first transmitter-receiver pair is the same (within practical tolerances) as that of the second pair. These equal optical path lengths advantageously minimize channel skew.

The above arrangement for channel 1 is repeated in this embodiment for a total of four channels that use $\lambda_1$ to communicate in both directions. All four channels have the same path lengths, for each of their transmitter-receiver pairs.

The arrangement of FIG. 3 also allows a second wavelength to be used in the optical link, to make bi-directional use of the waveguides in the link. In this case there are an additional four channels that can be supported using the same set of eight waveguides (that are used by the four $\lambda_1$ channels). These are indicated as channels 5-8, which share the same waveguides as the $\lambda_1$ channels and therefore use a different wavelength, $\lambda_2$.

In such an arrangement, it can be seen that there are a number of parallel waveguides, and each waveguide is used bi-directionally to carry the signals of two different channels. Thus, waveguide 1 supports channel 1 in the direction A to B, and also supports channel 8 in the direction B to A. Another way to view the arrangement of FIG. 3 is to recognize that the first and second transmitter-receiver pairs of each channel operate on the same wavelength, but in different waveguides.

In addition to the benefit of having the same optical path length for each transmitter-receiver pair, the arrangement in FIG. 3 has the same relative orientation of transmitters, receivers, and wavelengths, in both transceivers. This can be recognized by rotating transceiver B 180 degrees in the plane in which the transmitters and receivers are located, which then yields the same arrangement as in transceiver A. This makes the arrangement particularly beneficial for high volume manufacturing as two different transceiver arrangements are not required. This also helps reduce system level complexity, design, as well as inventory issues. The geometry of the arrangement of the transmitters and receivers may also enable a cleaner or easier routing of electrical signal traces to and from the optical transceiver, even as the channel count increases.

From an implementation standpoint, each transceiver in FIG. 3 may be a separate optical assembly that comprises an array of eight fibers arranged parallel to each other and side by side in a plane, as shown. An array of light sources (e.g., lasers, such as vertical cavity surface emitting lasers, VCSELs) are optically coupled to emit into their respective waveguides. The lasers in transceiver A are arranged to emit in the so-called upstream direction while the lasers in transceiver B are arranged to emit in the downstream direction of the waveguides. Each transceiver also has an array of eight photo detectors, which are coupled to the waveguides and located "behind" the lasers as shown in the figure. As an alternative however the photo detectors could be located in front of the lasers. The photo detectors and/or the lasers may be coupled to chromatic filters that couple the desired transmit light wavelength into the fibers, and decouple the proper received wavelength from the fibers. The photo detectors may be PIN photodiodes.

Figure 4:
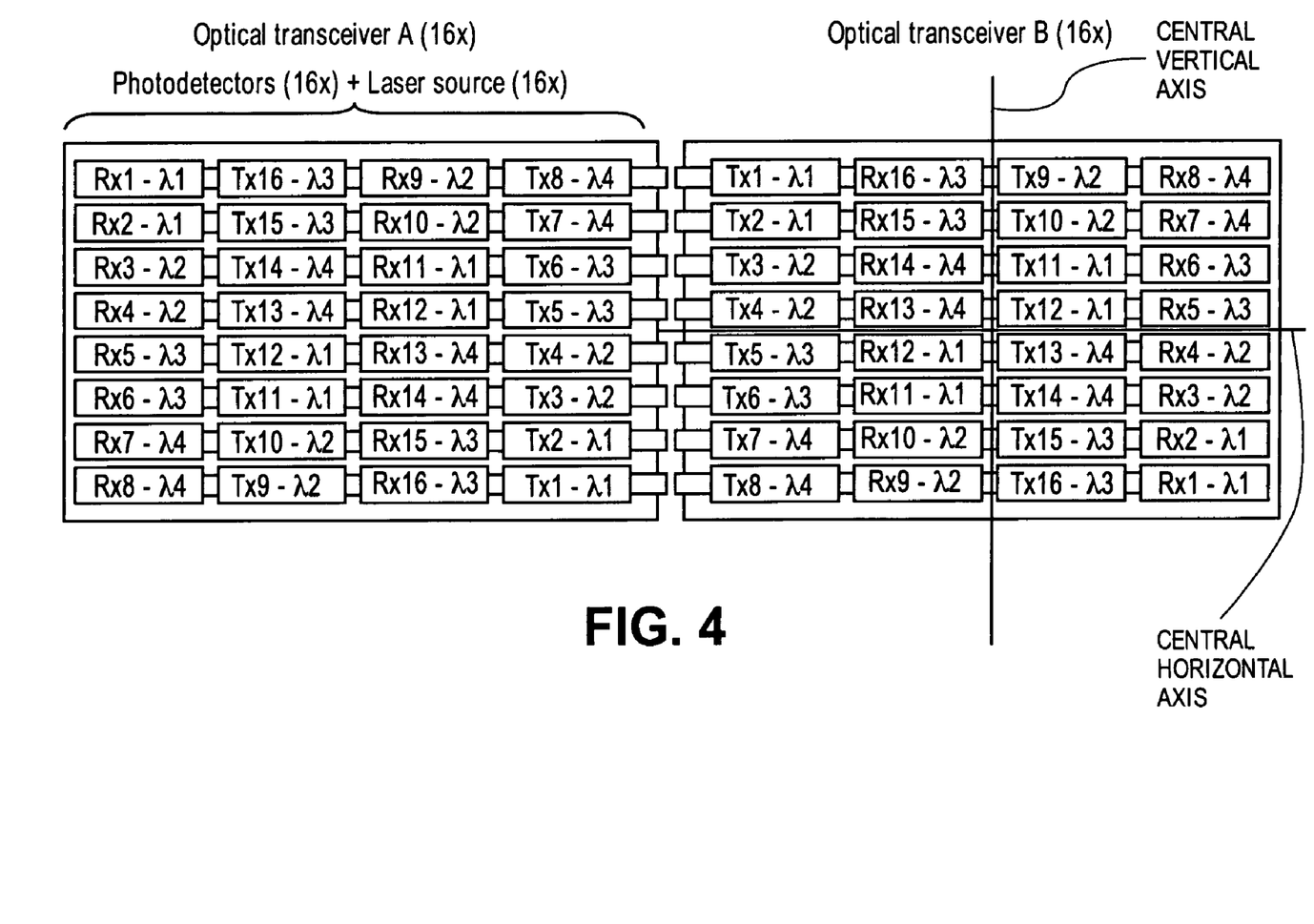
FIG. 4 depicts a parallel bi-directional optical link arranged in accordance with another embodiment of the invention.

Turning now to FIG. 4, a bi-directional parallel optical link is depicted in accordance with another embodiment of the invention. In this embodiment the number of channels has been increased to sixteen and the number of wavelengths has increased to four. At least some of the advantages available in the embodiment of FIG. 3 are also present here, namely equal optical path lengths for every transmitter-receiver pair and identical arrangements of the transmitters, receivers, and wavelengths in each transceiver. In this implementation, the light transmitters and light detectors in each transceiver are, again, arranged essentially in the same plane. Rotating either transceiver 180 degrees in that plane will give the same arrangement of channels that are to be used in the other transceiver, at least for a selected even number of waveguides.

Note that in each transceiver, the transmitters and receivers may be arranged in their respective columns as shown. For the sixteen channel embodiment of FIG. 4, the transceiver has four columns of alternating sets of transmitters and receivers, whereas for the eight channel embodiment of FIG. 3, there are two columns of transmitters and receivers, respectively.

It may be possible to define a general case for the embodiments of FIGS. 3 and 4, where each transceiver contains x transmitters, x receivers and y fibers, as follows. There are at least two fibers (y$\geq$2) in the link. To obtain all of the advantages mentioned above, there is at least an even number of fibers. The number of transmitters, x, and the number of receivers, y, is each an integer multiple of the number of fibers. To achieve a goal of having the same arrangement in each transceiver, the same number of transmitters as the number of receivers (that are to be active in the optical link) are coupled to each fiber. The number of wavelengths is equal to the sum of the number of receivers and the number of transmitters, divided by the number of fibers. In a given transceiver, the receivers and transmitters that are coupled to a given fiber operate at different wavelengths. Finally, the transmitter numbering or channel numbering in a given transceiver is preferably arranged in the opposite order as the receiver channel numbering. In other words, referring now to FIG. 3 where there are eight channels, the Tx1 is coupled to the same waveguide as Rx8, Tx2 is coupled to the same waveguide as Rx7, etc.

Additionally, to have an effective optical balance between all the channels (namely, balanced optical power and/or balanced latency), the path lengths and the number of filters and connectors (which add loss to a channel), for each transmitter-receiver pair, should be identical. For example, this is apparent in the embodiment of FIG. 4 by comparing the path for channel 1 (between Tx1 and Rx1) and channel 13 (Tx13-Rx13). In the A to B direction, Tx1 and Rx1 are separated by two transmitters, Tx8 and Tx16, and one receiver, Rx9. For channel 13, in the same direction, Tx13 and Rx13 are separated by two transmitters, Tx5 and Tx4, and a single receiver, Rx12. In the other direction, from B to A, Tx1 and Rx1 are separated by a single receiver, Rx9 and two transmitters, Tx8 and Tx16. For channel 13, the propagating signal also encounters a single receiver, Rx12, and two transmitters, Tx5 and Tx4. Thus, it can be seen that not only is the path length between each transmitter-receiver pair the same, but in this case the number of filters and connectors that are encountered by the propagating communication signal for each pair are also the same. This helps further improve the optical balance between all of the channels.

System Applications

Figure 5:
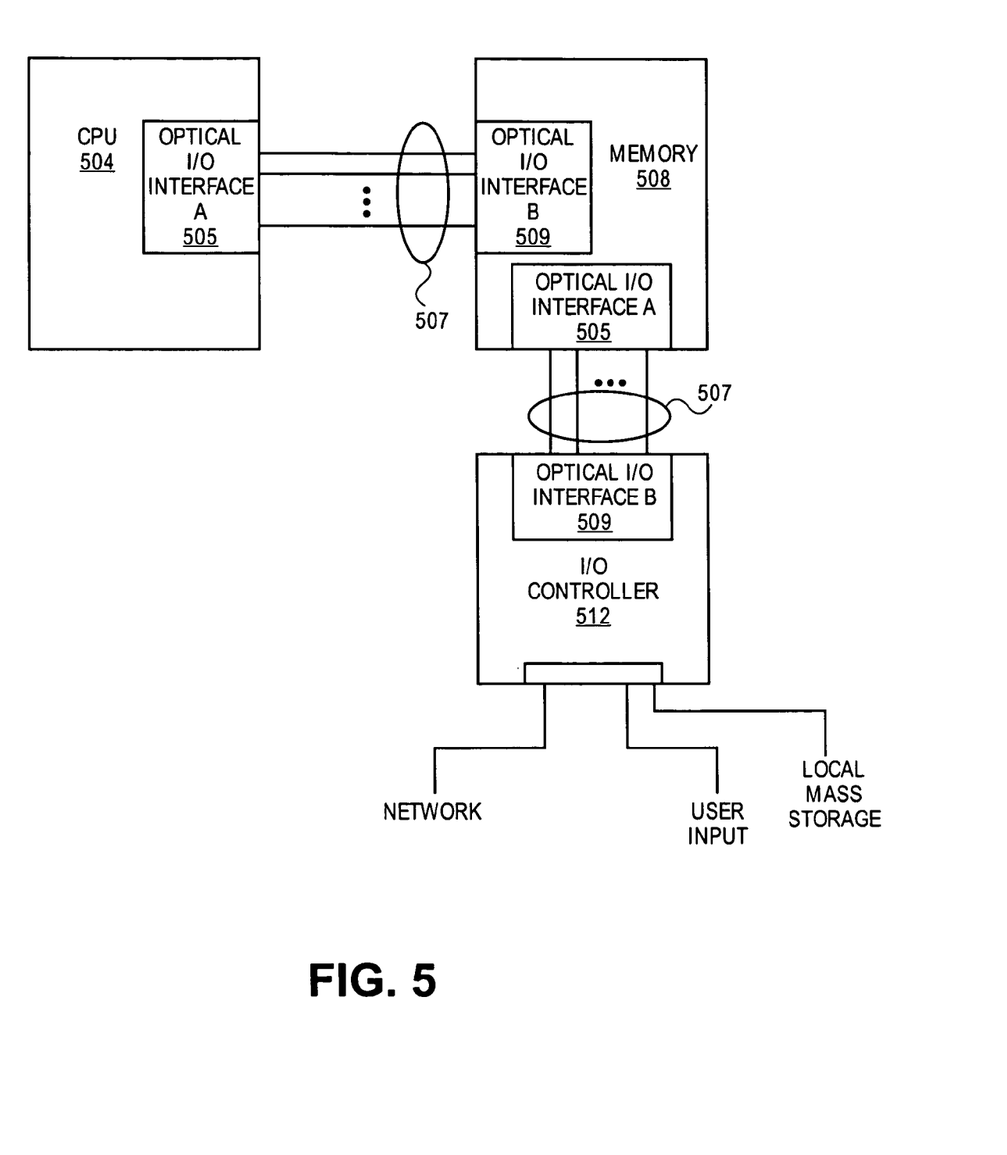
FIG. 5 shows a computer system with an optical link.

An optical transceiver as described above may be manufactured as a separate optical assembly or package that integrates transmission and reception capabilities within a single housing. The optical assembly may be pluggable onto a network device motherboard (via an electrical connector interface). The transceiver may alternatively be integrated with a separate data processing element of a system. The system may be a high performance personal computer (PC) or server with one or more processors in its central processing units (CPU) that are communicatively coupled to each other and/or to other computing elements via the optical links described above. In such a system, these data processing elements may share the same power supply circuitry. FIG. 5 illustrates such a system, where each of a CPU 504, a memory controller hub 508, and an I/O controller 512 has an optical I/O interface to communicate with another element of the system. An optical link in such a system comprises optical I/O interfaces 505, 509 in two elements connected by a set of waveguides 507, and corresponds to the connected optical transceivers described above, e.g. transceivers A and B in FIG. 3 or in FIG. 4. Note that each element may be in a separate carrier substrate than its optical I/O interface, and communicates with its interface via a high speed differential signaling link (not shown). In such an application, the optical path length between a pair of interfaces 505, 509 may be up to 15 centimeters.

In another system application, an optical link as described above may communicatively connect two separate systems, where each system may have its own power supply circuitry. For example, the optical link may connect two server blades that are in the same rack, or connect a server blade in one rack to a server blade in another rack. In all of these embodiments, the light transmitters of the link that are in a given transceiver are to transmit data that is sourced from higher layer hardware and software in its associated data processing element. In other words, the transmitters of interface A of CPU 504 transmit data that is "sent down" from upper layers of the CPU 504 hardware and software, intended to access memory 508. Similarly, the light detectors, that are part of the interface A, receive data over the optical waveguides 507, where this data is then "passed up" (and is intended for) the CPU 504 and its software.

The invention is not limited to the specific embodiments described above. For example, other types of transmitters not mentioned and that may be used include directly modulated optical sources such as Fabry-Perot lasers, distributed feedback (DFB) lasers, and an externally modulated laser (EML). Accordingly, other embodiments are within the scope of the claims.

What is claimed is:

1. An optical communications device comprising:
a first plurality of light transmitters of a first wavelength, coupled to a first plurality of waveguides of an optical data link, respectively;
a second plurality of light transmitters of a second wavelength different than the first wavelength, coupled to a second plurality of waveguides of the link, respectively, wherein the first and second plurality of light transmitters are to transmit data from the same data processing element that is to use the link to communicate with another data processing element;
a first plurality of light detectors of the first wavelength, coupled to the second plurality of waveguides, respectively; and
a second plurality of light detectors of the second wavelength, coupled to the first plurality of waveguides, respectively,
wherein the first and second plurality of light transmitters are arranged in a column, and the first and second plurality of light detectors are arranged in a different column.

2. The optical communications device of claim 1 wherein the first and second plurality of light detectors are to receive data for the same data processing element that is to use the link to communicate with another data processing element.

3. An optical transceiver comprising:
a first light transmitter of a first wavelength, coupled to a first waveguide;
a second light transmitter of a second wavelength different than the first wavelength, coupled to a second waveguide different than the first waveguide;
a first light detector of the first wavelength, coupled to the second waveguide; and
a second light detector of the second wavelength, coupled to the first waveguide, wherein the first and second light transmitters and the first and second light detectors are part of the same optical transceiver wherein the transmitters are in one column and the receivers are in another column, and wherein payload data of a first channel is carried by the first wavelengh in a downstream direction in the first waveguide and in an upstream direction in the second waveguide, and payload data of a second channel is carried by the second wavelength in an upstream direction in the first waveguide and in a downstream direction in the second waveguide.

4. The optical transceiver of claim 3 further comprising:
a third light transmitter of a third wavelength, coupled to a third waveguide different than the first and second waveguides; and
a third light detector of the third wavelength, coupled to the first waveguide, wherein the third light transmitter and the third light detector are part of the same optical transceiver.

5. A data processing system with an optical data link, comprising:
a first data processing element;
a second data processing element that shares power supply circuitry of the system with the first data processing element; and an optical data link that couples the first and second data processing elements, wherein the link comprises
a first optical interface,
a second optical interface, and
a plurality of optical waveguides an even number of which are coupled to the first interface at one point and to the second interface at another point,
the first and second interfaces are to transfer data between each other over a plurality of channels, and to operate each one of the even number of waveguides bi-directionally to transfer the data, and wherein
each channel has a first transmitter-receiver pair to communicate in a downstream direction, and a second transmitter-receiver pair to communicate in an upstream direction, in the first and second interfaces, the first and second pairs to operate on the same wavelength hut in different waveguides.

6. The data processing system of claim 5 wherein the optical path lengths of the first transmitter-receiver pairs of the plurality of channels are the same, and the optical path lengths of the second transmitter-receiver pairs of the plurality of channels are the same.

7. The data processing system of claim 5 wherein the first interface comprises a plurality of light transmitters and a plurality of light detectors coupled to the even number of waveguides, to operate at a plurality of different wavelengths,
the plurality of light transmitters and the plurality of light detectors in the first interface being arranged in a plane and in such a way that rotating the first interface 180 degrees in said plane will give the same layout of transmitters, detectors and wavelengths that are used in the second interface, to communicate with the first interface over the even number of waveguides.

8. The data processing system of claim 5 wherein in the optical link, the number of transmitters coupled to the even number of waveguides is an integer multiple of the even number and the number of detectors coupled to the even number of waveguides is an integer multiple of the even number.

9. The data processing system of claim 5 wherein in the optical link, each of the even number of waveguides has the same number of transmitters coupled to it, and the same number of detectors coupled to it.

10. The data processing system of claim 5 wherein in the optical link, the number of different wavelengths, used by the first interface to communicate over the even number of waveguides, is equal to the number of transmitters plus the number of detectors in the first interface that are coupled to the even number of waveguides, divided by the even number.

11. The data processing system of claim 10 wherein in the first interface, a column of transmitters and a column of detectors are arranged with opposite channel numbering.

12. The data processing system of claim 10 wherein the first interface comprises an arrangement of a plurality of light transmitters and a plurality of light detectors coupled to the even number of waveguides, to operate at a plurality of different wavelengths, the location of the transmitter for each of the channels is given by mirroring the location of the receiver for the channel, across a central horizontal axis and then across a central vertical axis of the arrangement.

13. A data processing system with an optical data link, comprising:
a first data processing element;
a second data processing element; and
an optical data link that couples the first and second data processing elements, wherein the link comprises
a first optical interface,
a second optical interface, and
a plurality of optical waveguides coupled to the first interface at one point and to the second interface at another point,
the first and second interfaces are to transfer data between each other over a plurality of channels, and to operate each one of the waveguides bi-directionally to transfer the data, and wherein
each channel has, in the first and second interfaces, a first transmitter-receiver pair to communicate in a downstream direction and a second transmitter-receiver pair to communicate in an upstream direction, the first and second pairs to operate on the same wavelength but in different waveguides, and wherein the transmitter and the receiver of each pair are separated by an optical path length, the optical path lengths of all of said transmitter-receiver pairs being equal.

14. The data processing system of claim 13 wherein the first interface comprises a plurality of light transmitters and a plurality of light detectors coupled to the waveguides, to operate at a plurality of different wavelengths,
the plurality of light transmitters and the plurality of light detectors in the first interface being arranged in a plane and in such a way that rotating the first interface 180 degrees in said plane will give the same layout of transmitters, detectors and wavelengths that are used in the second interface, to communicate with the first interface over the waveguides.

15. The data processing system of claim 13 wherein in the optical link, the number of transmitters coupled to the waveguides is an integer multiple of the number of said waveguides and the number of detectors coupled to the waveguides is an integer multiple of the number of said waveguides.

16. The data processing system of claim 13 wherein in the optical link, each of the waveguides has the same number of transmitters coupled to it, and the same number of detectors coupled to it.

17. The data processing system of claim 13 wherein in the optical link, the number of different wavelengths, used by the first interface to communicate over the waveguides, is equal to the number of transmitters plus the number of detectors in the first interface that are coupled to the waveguides, divided by the number of said waveguides.

18. The data processing system of claim 13 wherein in the first interface, a column of transmitters and a column of detectors are arranged with opposite channel numbering.

19. The data processing system of claim 13 wherein the first interface comprises an arrangement of a plurality of light transmitters and a plurality of light detectors coupled to the waveguides, to operate at a plurality of different wavelengths, the location of the transmitter for each of the channels is given by mirroring the location of the receiver for the channel, across a central horizontal axis and then across a central vertical axis of the arrangement.

* * * * *

UNITED STATES PATENT AND TRADEMARK OFFICE
CERTIFICATE OF CORRECTION

| | | |
|---|---|---|
| PATENT NO. | : 7,941,052 B2 | |
| APPLICATION NO. | : 11/634743 | |
| DATED | : May 10, 2011 | |
| INVENTOR(S) | : Epitaux et al. | |

It is certified that error appears in the above-identified patent and that said Letters Patent is hereby corrected as shown below:

In column 7, at line 17 delete, "hut" and insert -- but --.

Signed and Sealed this
Ninth Day of August, 2011

David J. Kappos
*Director of the United States Patent and Trademark Office*